United States Patent [19]
Haus et al.

[11] Patent Number: 5,726,787
[45] Date of Patent: Mar. 10, 1998

[54] APPARATUS AND METHOD FOR IMPROVING SIGNAL-TO-NOISE RATIO IN WAVELENGTH DIVISION MULTIPLEXING SOLITON TRANSMISSION SYSTEMS

[75] Inventors: Hermann A. Haus, Lexington, Mass.; Wayne H. Knox, Rumson; David A. B. Miller, Fair Haven, both of N.J.

[73] Assignee: Lucent Technologies Inc., Murray Hill, N.J.

[21] Appl. No.: 579,864

[22] Filed: Dec. 28, 1995

[51] Int. Cl.$^6$ ................................................ H04B 10/00
[52] U.S. Cl. ........................ 359/161; 359/131; 359/173; 359/179
[58] Field of Search ................................ 359/124, 131, 359/161, 173, 179, 188, 195; 385/122

[56] References Cited

U.S. PATENT DOCUMENTS 5,532,861  7/1996  Pirio et al. ............................ 359/161

Primary Examiner—Kinfe-Michael Negash

[57] ABSTRACT

For use in a soliton optical pulse transmission system, an apparatus for, and method of, increasing a signal-to-noise ratio of the system. The apparatus includes: (1) a component for receiving a soliton and an accompanying background noise from the system and increasing a power density of the soliton and the accompanying background noise and (2) a saturable absorber, having a predetermined recombination rate, for receiving and absorbing a portion of the soliton and the accompanying background noise, the predetermined recombination rate causing the saturable absorber to absorb a lesser portion of the soliton than of the accompanying background noise, the component having increased the power density of the soliton and the accompanying background noise to increase a sensitivity of the saturable absorber, the apparatus thereby increasing the signal-to-noise ratio of the system.

15 Claims, 5 Drawing Sheets

APPARATUS AND METHOD FOR IMPROVING SIGNAL-TO-NOISE RATIO IN WAVELENGTH DIVISION MULTIPLEXING SOLITON TRANSMISSION SYSTEMS

TECHNICAL FIELD OF THE INVENTION

The present invention is directed, in general, to optical communications systems and, more specifically, to an apparatus and method for improving signal-to-noise ratio in wavelength division multiplexing ("WDM") soliton transmission systems.

BACKGROUND OF THE INVENTION

Given the rapid generation, dissemination and absorption of information in today's society, high speed communication of lightwave signals over optical fiber links provides, more than ever, a focal point of intense interest for scientists and engineers alike.

Often, optical fiber transmission links include both electronic and optical components. Since optical signals often require purely optical processing, it is often appropriate to generate optical signals from, and eventually transform optical signals back into, electronic signals.

Conventionally, an optical transmitter, comprising a drive circuit and a light source (such as a solid state laser), converts an electronic signal into an optical signal (most often consisting of a series of individual pulses). The optical signal is caused to propagate through an optical fiber having a cladding surrounding a core. The material of choice for both the cladding and core is pure silica, doped with impurities to yield different respective indices of refraction, with the objective being to contain the optical signal within the core by a phenomenon called "total internal reflection."

The optical fiber may contain splices along its length; the splices are designed to be as transparent as possible to the optical signal. The optical fiber may also feed into beam splitters or couplers that respectively divide, or combine other optical signals into, the optical signal. Because the optical fiber distorts or attenuates the optical signal as it travels through the optical fiber, interspersed electronic or optical regenerative repeaters or amplifiers may be required to restore or increase the optical signal's intensity periodically. Finally, an optical receiver, comprising a photodetector (such as a solid state photodiode), an amplifier and a signal conditioner, transforms the optical signal back into electronic form for use with electronic circuitry.

As mentioned above, repeaters or amplifiers may be required to restore an optical signal that has degraded by virtue of having travelled through an optical fiber. Often, optical signals must be restored after travelling a distance of 100 km or so. The chief culprit responsible for degrading optical signals is chromatic dispersion, brought about by physical interaction of the optical signal with the material constituting the optical fiber. Dispersion causes the frequency components of a given optical pulse to spread, redistributing the energy in the pulse past the point at which the information carried in the pulse becomes unrecoverable.

Although optical fibers may be approximated as linear waveguides, it has been found that they do exhibit certain nonlinearities in their response to optical signals. Among other effects, the nonlinearities may modulate the frequency of the carrier wave underlying a given optical pulse (so-called "self-phase modulation"). Such modulation of the carrier wave is referred to as "chirping." Depending upon carrier wave frequency and the shape and power of the pulse, chirping most often causes the pulse to disperse more rapidly. However, if conditions are right, chirping may actually concentrate the pulse to a minimum width before assisting in its dispersion.

If the pulse is of the right shape and power and the underlying carrier wave is of the right frequency, concentration of the pulse brought about by chirping may be made exactly to counteract spreading of the pulse brought about by dispersion, resulting in a net balanced response by the optical fiber to the pulse. The optical fiber maintains the pulse in its original shape and thereby transmits the pulse nondispersively over distances far greater than 100 km. In fact, transoceanic distances are theoretically attainable without regeneration.

A pulse meeting such requirements is called a "soliton." Although solitons do not solve the problem of dispersion in optical fibers, they do offer dramatic increases over ordinary optical pulses in data rate and the maximum distance they can travel before requiring regeneration.

One objective in designing optical communication systems is maximizing the data rate therethrough. In addition to simply increasing the rate of a single channel, multiple channels may be created over a single optical fiber. So-called "wavelength division multiplexing" ("WDM") allows at least two separate channels of optical signals of different wavelength (frequency) to be carried on a single optical fiber.

It is natural to combine the concepts of solitons and WDM to produce a soliton transmission system with multiple channels and therefore carry a great amount of information over long distances. However, it has been found that ultra-long soliton transmission systems operating at data rates of 2.5 gigabits per second (Gbps) and above develop a noise background or "pedestal" that is broadband in spectrum and roughly continuous in time by virtue of cross-coupling between the channels. The noise background degrades the signal-to-noise ratio of the system, and therefore ultimately limits the information capacity of the system as a whole. What is needed in the art is an apparatus and method for improving the signal-to-noise ratio in WDM soliton transmission systems. However, the apparatus and method must be able to operate with solitons, which only contain about 1 picojoule (pJ) of energy.

SUMMARY OF THE INVENTION

To address the above-discussed deficiencies of the prior art, the present invention provides, for use in a soliton optical pulse transmission system, an apparatus for, and method of, increasing a signal-to-noise ratio of the system.

The apparatus includes: (1) a component for receiving a soliton and an accompanying background noise from the system and increasing the power density of the soliton and the accompanying background noise and (2) a saturable absorber, having a predetermined recombination rate, for receiving and absorbing a portion of the soliton and the accompanying background noise, the predetermined recombination rate causing the saturable absorber to absorb a lesser portion of the soliton than of the accompanying background noise, the component having increased the power density of the soliton and the accompanying background noise to increase a sensitivity of the saturable absorber. In this manner, the apparatus thereby increases the signal-to-noise ratio of the system.

The present invention therefore allows a power-density-increasing component (such as an amplifier or an optical focussing element) and a saturable absorber to cooperate to reduce the background noise inherent in soliton transmission systems. The saturable absorber is "tuned" to the wavelength of the soliton to minimize its attenuation. In a manner to be described, increasing the power density of the soliton results in increased saturability within the saturable absorber.

In one embodiment of the present invention, the component is a first optical component for spatially concentrating the soliton and the accompanying background noise, the apparatus further comprising a second optical component for receiving and spatially restoring a remaining portion of the soliton and the accompanying background noise, the second optical component returning the spatially-restored soliton and the accompanying background noise to the system. In this embodiment, the power density is increased by focussing the soliton into a smaller area, rather than by increasing its overall power.

In a more specific embodiment, the first and second optical components are refractive elements composed of a material having an index of refraction higher than that of a core of an optical fiber of the system. Alternatively, diffractive components may be employed to focus the soliton and its accompanying noise.

In one embodiment of the present invention, the apparatus is generally spherical, the first and second optical components being generally hemispherical and disposed on opposite sides of the saturable absorber. The spherical shape is ideally compact, allowing the apparatus to be placed within a hole or slot in a silicon substrate.

In one embodiment of the present invention, the component is an amplifier for increasing the power of the soliton and the accompanying background noise. Again, the present invention increases the power density of the soliton and the accompanying background noise to increase the sensitivity of the saturable absorber. The amplifier, while not necessary to the present invention, increases the power density by increasing the overall power.

In one embodiment of the present invention, the saturable absorber is composed of a material selected from the group consisting of: (1) gallium arsenide (GaAs), (2) indium gallium arsenide (InGaAs), (3) gallium aluminum arsenide (GaAlAs), (4) indium gallium aluminum arsenide (InGaAlAs) and (5) indium phosphide (InP). Those of ordinary skill in the art will recognize that other semiconducting materials may be employed to advantage in the saturable absorber, as long as the recombination rate of the photocarriers therein is appropriate or an electroabsorptive effect may be advantageously created therein.

In one embodiment of the present invention, the system is a WDM system, the apparatus further comprising a WDM filter for separating the plurality of channels carried thereon into separate optical paths, each of the separate optical paths having one of the apparatus for increasing the signal-to-noise ratio associated therewith, the WDM filter recombining the plurality of separate optical paths. The present invention finds advantageous use in a WDM system, wherein cross-coupling produces continuous, broadband noise. However, soliton transmission systems, in general, would benefit from the present invention.

In one embodiment of the present invention, the apparatus further comprises conductive layers disposed about the saturable absorber for generating an electric field proximate the saturable absorber, the electric field stimulating an electroabsorptive effect in the saturable absorber to increase the absorbing of the portion of the spatially-concentrated soliton and accompanying background noise. In a manner to be described, the electroabsorptive effect provides additional absorption of the background noise. However, the apparatus may be completely passive, and therefore not field-driven.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
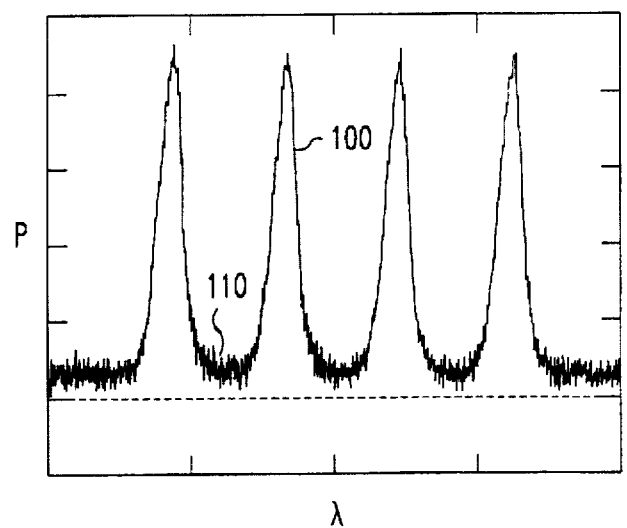
FIG. 1 illustrates a diagram of a soliton and accompanying continuous, broadband background noise before absorption by the apparatus of the present invention.

Referring initially to FIG. 1, illustrated is a diagram of a soliton 100 and an accompanying continuous, broadband background noise 110 before absorption by the apparatus of the present invention. The soliton 100 appears as a pulse or spike. The noise 110 appears as a roughly continuous pedestal upon which the soliton 100 sits. As previously described, in soliton transmission systems, and particularly in WDM soliton transmission systems, photocarrier cross-coupling in the optical fiber creates broadband, continuous noise 110 that degrades the signal-to-noise ratio, and ultimately the range and information-carrying capacity, of the system.

Figure 2:
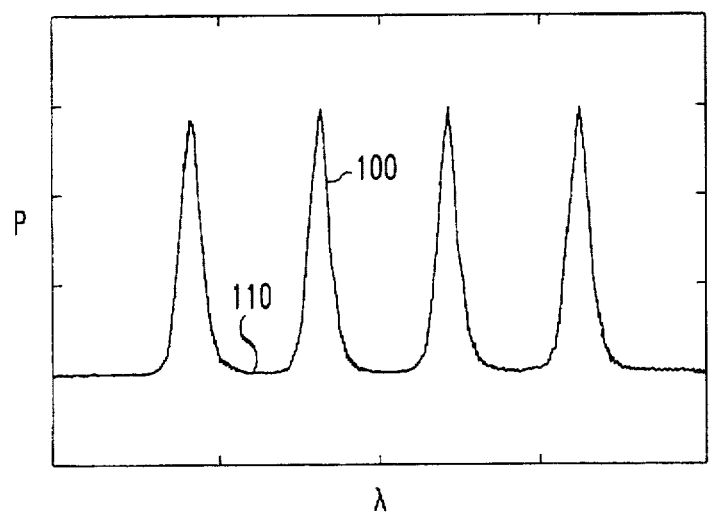
FIG. 2 illustrates a diagram of the soliton and accompanying continuous, broadband background noise after absorption by the apparatus of the present invention.

Turning now to FIG. 2, illustrated is a diagram of the soliton 100 and accompanying continuous, broadband background noise 110 after absorption by the apparatus of the present invention. The primary object of the present invention is to increase the signal-to-noise ratio of a soliton transmission system. This may be done by disproportionately increasing the signal level, disproportionately decreasing the noise 110 level, or both.

The present invention advantageously employs a saturable absorber to decrease the noise 110 level disproportionately. The soliton 100 has a higher peak power than the noise 110. The saturable absorber is designed to have a photocarrier lifetime (or recombination rate) about equal to the pulsewidth of the soliton 100. Interaction among the soliton 100, the noise 110 and the photocarriers causes energy in the soliton 100 and the noise 110 to be dissipated into the orbits of the photocarriers. The intensity dependence of the dissipation is such that relatively less of the energy (or peak power) of the soliton 100 is dissipated. The noise 110 is attenuated more than the soliton 100, because the noise 110 has a lower peak power. Indeed, FIG. 2 shows that, while the soliton 100 level is decreased, the noise 110 level is disproportionately decreased, resulting in an overall improvement in signal-to-noise ratio.

Figure 3:
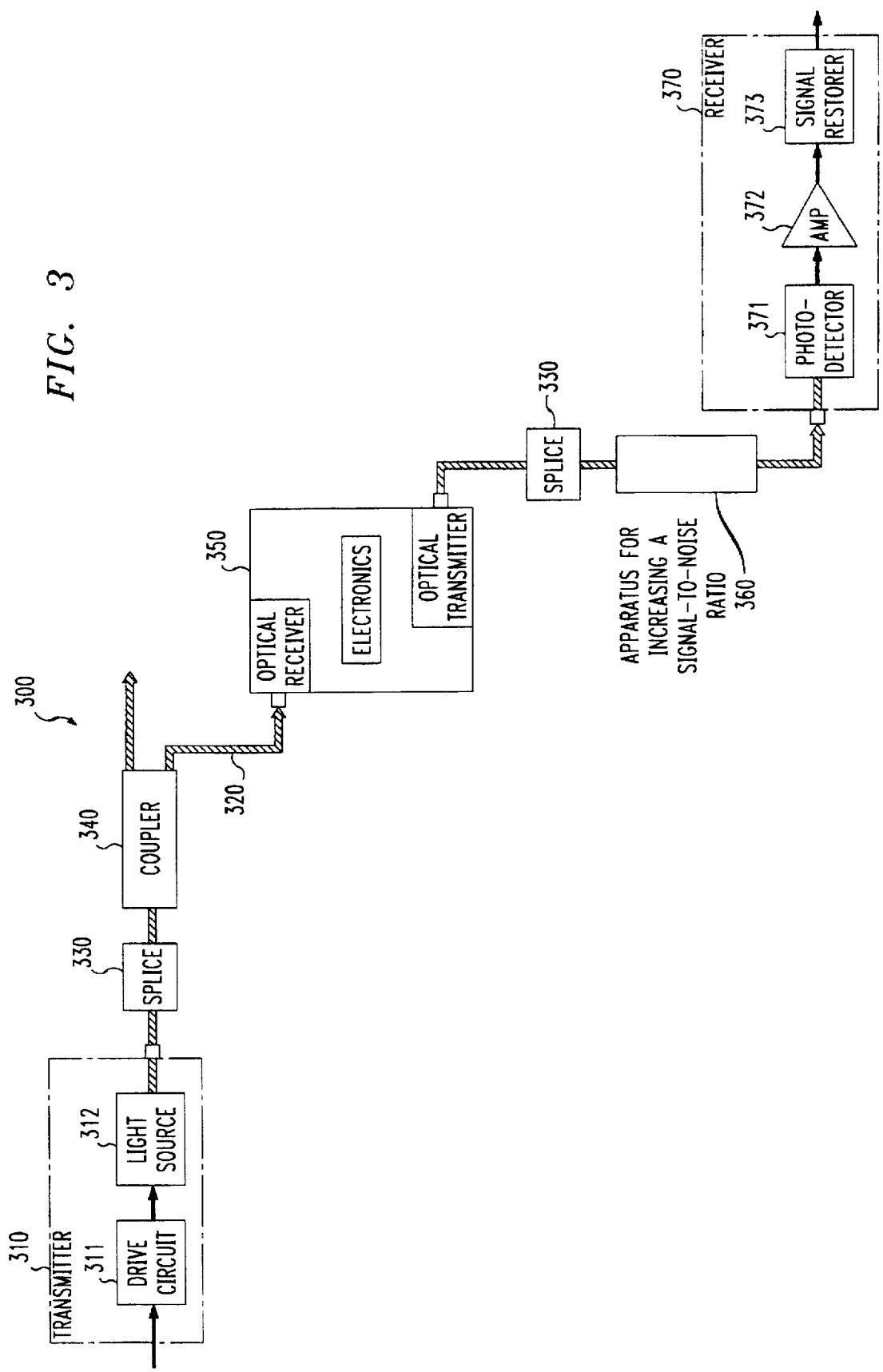
FIG. 3 illustrates a WDM soliton optical pulse transmission system employing an apparatus, constructed according to the present invention, for increasing a signal-to-noise ratio of the system.

Turning now to FIG. 3, illustrated is a WDM soliton optical pulse transmission system employing an apparatus, constructed according to the present invention, for increasing a signal-to-noise ratio of the system. The system, generally designated 300, comprises an optical transmitter 310, that itself comprises a drive circuit 311 and a light source 312 (such as a solid state laser). The optical transmitter 310 converts an electronic signal into an optical signal (most often consisting of a series of individual pulses and, more specifically, solitons).

The optical signal is caused to propagate through an optical fiber 320 having a cladding surrounding a core (not separately shown in FIG. 3). The optical fiber 320 may contain splices 330 along its length. The splices 330 are designed to be as transparent as possible to the optical signal. The optical fiber may also feed into beam splitters or couplers 340 that respectively divide, or combine other optical signals into, the optical signal.

Because the optical fiber distorts or attenuates the optical signal as it travels through the optical fiber 320, interspersed electronic or optical regenerative repeaters or amplifiers 350 may be required to restore or increase the optical signal's intensity periodically.

The present invention is shown in FIG. 3 as an apparatus 360, interposed into the system 100, for increasing the signal-to-noise ratio of the system 300. Finally, an optical receiver 370, comprising a photodetector 371 (such as a solid state photodiode), an amplifier 372 and a signal conditioner 373, transforms the optical signal back into electronic form for use with electronic circuitry (not shown).

Figure 4:
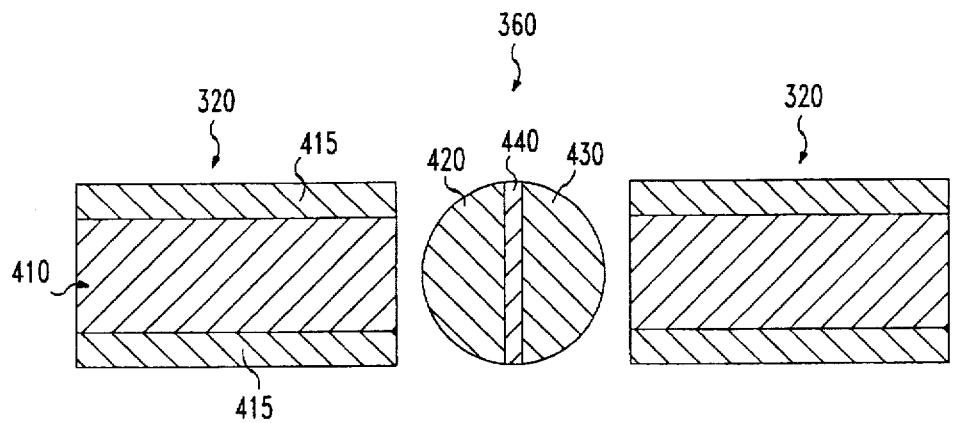
FIG. 4 illustrates a cross-sectional view of an embodiment of the apparatus of FIG. 3 employing a spatial concentrating first optical component and a spatially-restoring second optical component.

Turning now to FIG. 4, illustrated is a cross-sectional view of an embodiment of the apparatus 360 of FIG. 3 employing a spatially-concentrating first optical component 420 and a spatially-restoring second optical component 430. Shown on either side of the apparatus 360 is the optical fiber 320 of FIG. 3. As previously described, the optical fiber has a core 410 and a cladding 415. The soliton 100 and noise 110, upon which the present invention operates, reside within the core 410.

In the embodiment of the present invention illustrated in FIG. 4, the apparatus 360 comprises the first and second optical components 420, 430 with a saturable absorber 440 disposed therebetween. The first and second optical components 420, 430 are illustrated as being in the form of hemispheres and therefore act as convex lenses, converging any light incident thereon. Preferably, the first and second optical components 420, 430 are composed of a transparent optical material having an index of refraction higher than that of the core 410 of the optical fiber 320 (such as silicon, which has an index of refraction n of about 3.5). If the first and second optical components 420, 430 are composed of silicon and the wavelength $\gamma$ of the soliton 100 is 1550 nm, the first optical component 420 will spatially concentrate the soliton 100 onto a spot size having a radius of about 0.44 micron. If the radius of the core 410 is about 9 microns, the soliton received therefrom is increased in power density and reduced in area, resulting in a gain in intensity of about 418. After the saturable absorber 440 acts on the soliton 100 and noise 110, the second optical component collimates the light diverging therefrom to restore the soliton to its original area.

The saturable absorber 440 is shown as a thin layer of material interposed between the first and second optical components 420, 430. The saturable absorber 440 is preferably composed of a material, such as p-doped InGaAs, that is capable of entering into saturation to absorb energy from light. The thin layer should at least be translucent, and is most preferably transparent, to the soliton 100.

Whether by spatially-concentrating the soliton 100 with the first optical component 420 or by increasing power density through some other means, the soliton 100 and the noise 110 are preferably increased in power density to increase a sensitivity of the saturable absorber 440 to the energy in the soliton 100 and the noise 110. With respect to the soliton 100, if it is assumed that the soliton contains 1 pJ of energy ($10^{-12}$ J), the number of photons within the soliton 100 is about $8 \times 10^6$. Given a 0.44 micron spot size, the focussed intensity of the photons is about $5 \times 10^{15}$ photons per cm$^2$. Absorption by saturable absorber 440 of the photons in the soliton 100 is about 1%, resulting in an excited carrier density of about $5 \times 10^{13}$ photocarriers per cm$^2$. This is about 100 times more than the excitation saturation density of InGaAs, thereby driving it into saturation.

As described above, WDM soliton transmission systems carry multiple channels on a single optical fiber 320. In such systems, interaction among the photocarriers in the saturable absorber causes the separate channels to cross-couple, degrading system performance. One solution is to separate the channels and pass the solitons therein through separate saturable absorbers.

Figure 5:
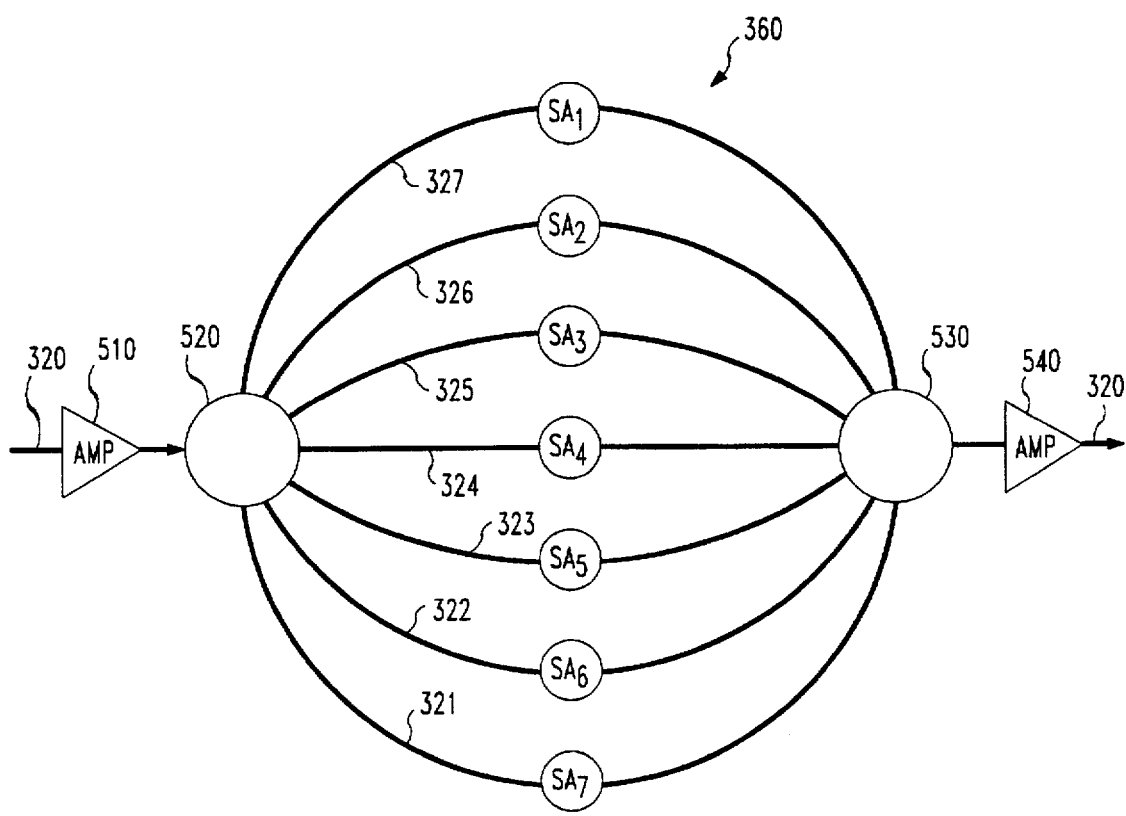
FIG. 5 illustrates a schematic diagram of an alternative embodiment of the apparatus of FIG. 3 employing a WDM filter and separate apparatus for each channel.

Accordingly, turning now to FIG. 5, illustrated is a schematic diagram of an alternative embodiment of the apparatus of FIG. 3 employing a WDM filter and separate apparatus for each channel. The apparatus illustrated is designed for a 7 channel WDM soliton transmission system. Accordingly, there are 7 separate saturable absorbers, designated $SA_1$ through $SA_7$.

Solitons 100 and the accompanying background noise 110 enter the apparatus via a lefthand portion (as shown) of the optical fiber 320. An optional amplifier 510 increases the power of the solitons 100 and the accompanying background noise 110. A WDM filter 520 separates the solitons 100 corresponding to each of the 7 channels, placing each of the channels on a separate optical fiber 321, 322, 323, 324, 325, 326, 327. The separate channels therefore may be treated individually in each of the corresponding saturable absorbers $SA_1$ through $SA_7$.

Following processing in the saturable absorbers $SA_1$ through $SA_7$, the separate channels are recombined in a WDM coupler 530. After combination, the channels may again be amplified in an optional amplifier 540 and delivered to the righthand portion (as shown) of the optical fiber 320. Again, the advantage in dividing the channels for processing through separate saturable absorbers is that interaction between the channels during the absorption process is not possible. Therefore, it is not necessary to address cross-coupling with, for example, sliding-guiding filters.

Figure 6:
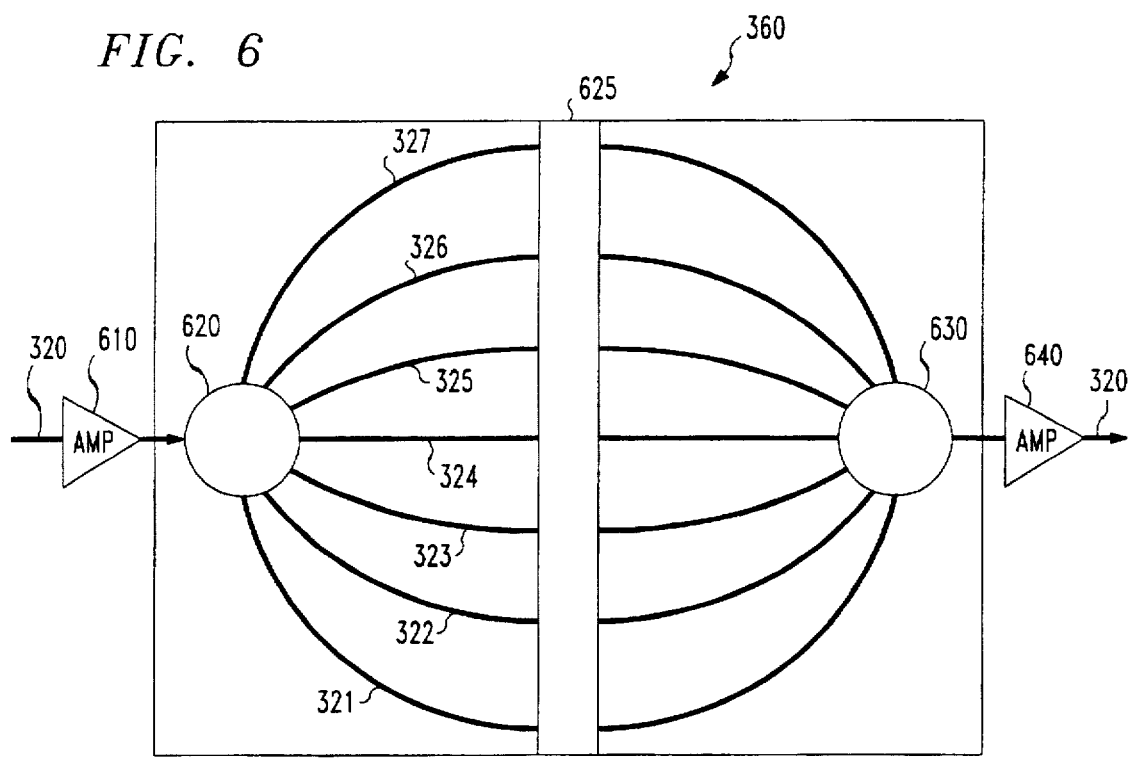
FIG. 6 illustrates a schematic diagram of a further alternative embodiment of the apparatus of FIG. 3 employing an amplifier and a butt-coupled saturable absorber.

Turning now to FIG. 6, illustrated is a schematic diagram of a further alternative embodiment of the apparatus of FIG. 3 employing an amplifier and a butt-coupled saturable absorber. In this further alternative embodiment, the power density of the incoming solitons 100 is increased by increasing the power of each soliton (instead of decreasing the area over which the soliton is spread).

Accordingly, solitons 100 and the accompanying background noise 110 again enter the apparatus via a lefthand portion (as shown) of the optical fiber 320. An amplifier 610 increases the power of the solitons 100 and the accompanying background noise 110. A WDM filter 620 separates the solitons 100 corresponding to each of the 7 channels, placing each of the channels on the separate optical fibers 321, 322, 323, 324, 325, 326, 327.

Following processing in a saturable absorber 625, the separate channels are recombined in a WDM coupler 630. After combination, the channels may again be amplified in an optional amplifier 640 and delivered to the righthand portion (as shown) of the optical fiber 320.

In FIG. 6, the saturable absorber 625 is shown as a single layer of saturable absorber material. Instead of providing separate substrates, each with a layer of saturable absorbing material associated therewith (as with the saturable absorbers $SA_1$ through $SA_7$ of FIG. 5), a single silicon substrate may be provided with a broad layer of saturable absorbing material.

Figure 7:
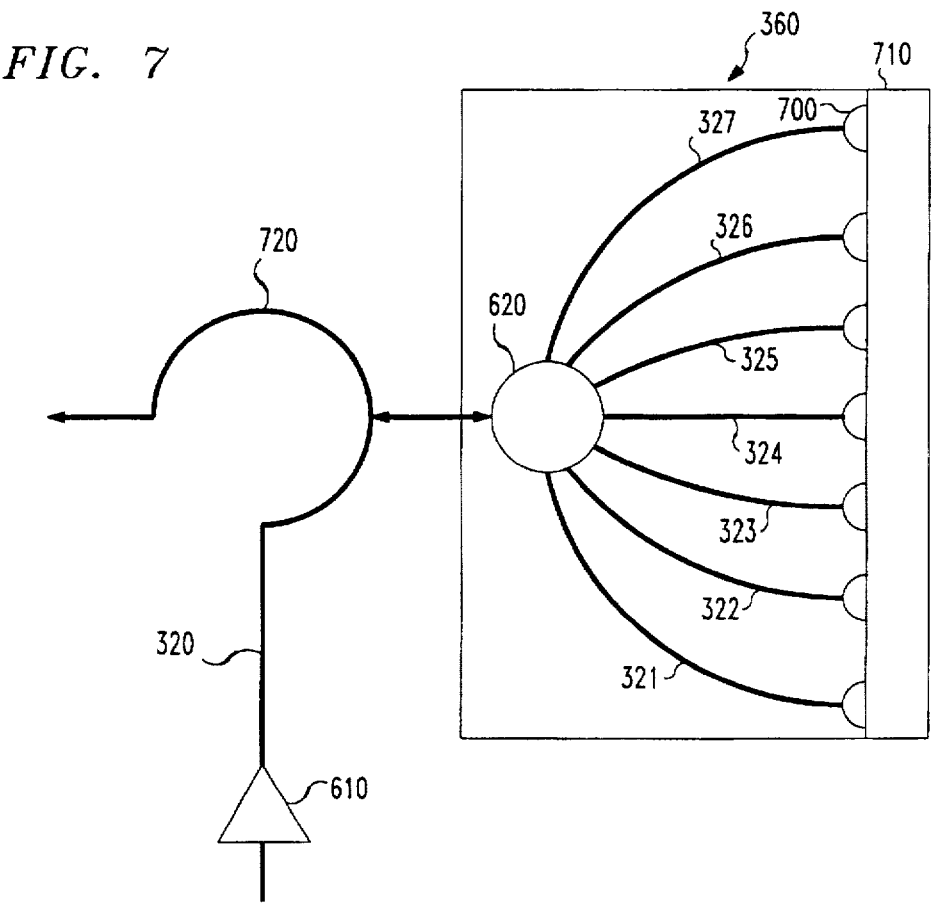
FIG. 7 illustrates a schematic diagram of a further alternative embodiment of the apparatus of FIG. 3 employing an amplifier, a butt-coupled saturable absorber and a reflector.

Turning now to FIG. 7, illustrated is a schematic diagram of a further alternative embodiment of the apparatus of FIG. 3 employing an optional amplifier 610, a WDM filter 620, butt-coupled saturable absorbers 700, a reflector 710 and a circulator 720. Recognizing that the structure of FIG. 5 is symmetric about the saturable absorbers $SA_1$ through $SA_7$, a reflector 710 may be employed to reflect the solitons back through the first optical component 420, thereby additionally employing the first optical component 420 in the role formerly occupied by the second optical component 430 of FIG. 4.

Figure 8:
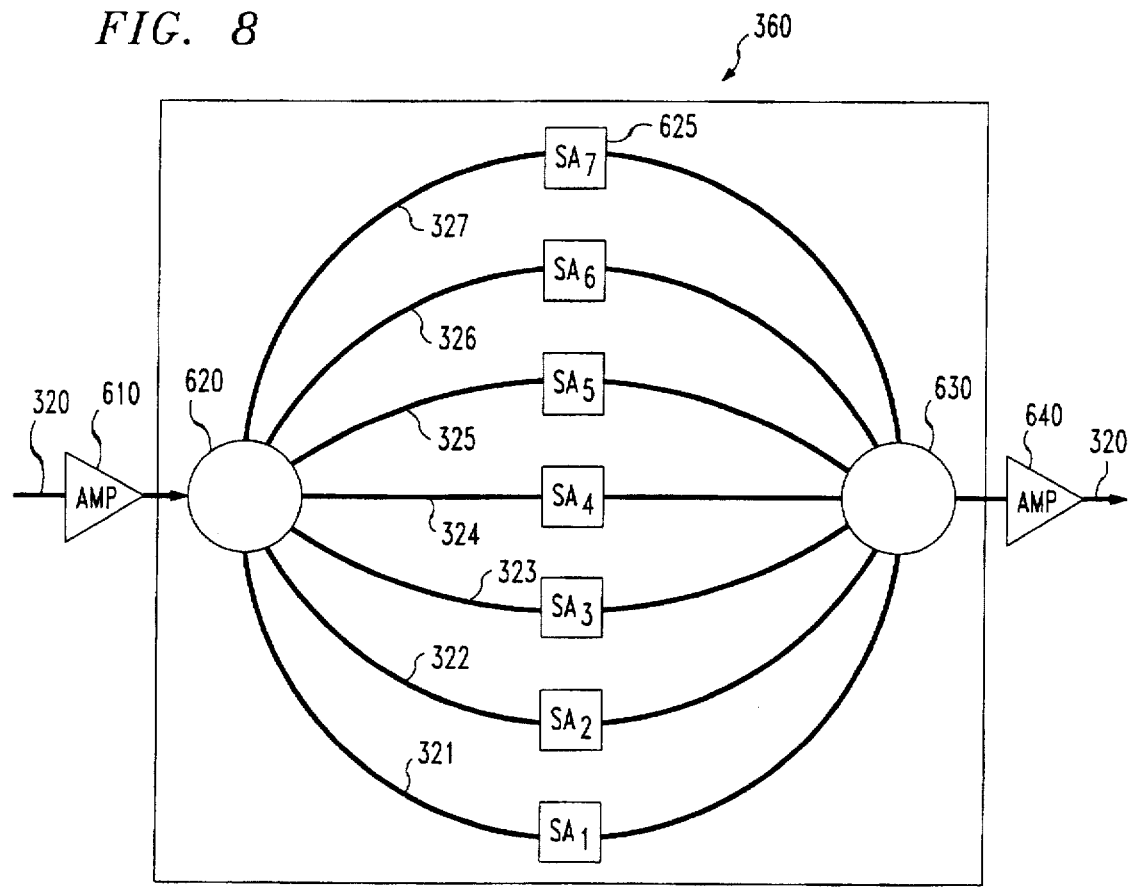
FIG. 8 illustrates a schematic diagram of still a further alternative embodiment of the apparatus of FIG. 3 employing a passive InP saturable absorber.

Turning now to FIG. 8, illustrated is a schematic diagram of still a further alternative embodiment of the apparatus of FIG. 3 employing a passive InP saturable absorber. Solitons 100 and the accompanying background noise 110 again enter the apparatus via a lefthand portion (as shown) of the optical fiber 320. An amplifier 610 increases the power of the solitons 100 and the accompanying background noise 110. A WDM filter 620 separates the solitons 100 corresponding to each of the 7 channels, placing each of the channels on the separate optical fibers 321, 322, 323, 324, 325, 326, 327.

Following processing in separate, passive InP saturable absorbers 625, the separate channels are recombined in a WDM coupler 630. After combination, the channels may again be amplified in an optional amplifier 640 and delivered to the righthand portion (as shown) of the optical fiber 320.

One alternative method of making a saturable absorber is to employ a field-screening electroabsorptive saturable absorber. A field-screening saturable absorber has several advantages over other types of saturable absorbers. First, a field-screening saturable absorber can be made more sensitive, thereby requiring less energy to achieve the necessary saturation. Second, the recovery time of the saturation can be controlled through changes in electrical parameters, such as resistance, capacitance or material resistivities. Finally, the absorption strength can be controlled by electrical parameters, such as the voltage or current level of a control signal applied to the field-screening saturable absorber.

Figure 9:
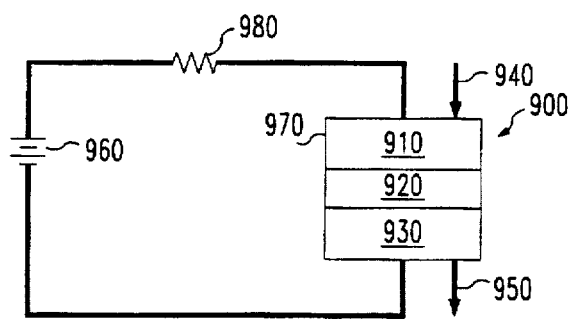
FIG. 9 illustrates a schematic diagram of yet a further alternative embodiment of the apparatus of FIG. 3 employing a voltage source and using the electroabsorptive effect to increase absorption.

Turning now to FIG. 9, illustrated is a highly schematic diagram of a field-screening saturable absorber constituting yet another embodiment of the apparatus of FIG. 3. The saturable absorber 900 takes the form of an electrical diode having three distinct regions. Region 910 is a p-doped semiconductor contact layer. Region 930 is an n-doped semiconductor contact layer. Both regions 910 and 930 are advantageously chosen to be transparent. An interposed electroabsorptive region 920 is a layer of material chosen so that its optical absorption depends on the electric field across it, an effect known as electroabsorption. Advantageously, it may be chosen to be a semiconductor layer with low or no doping. The saturable absorber 900 then constitutes a convenient structure and means for applying and changing the electric field across the electroabsorptive region 920, for example by reverse-biasing the saturable absorber 900.

Electroabsorptive effects are well-known in semiconductor materials. One such effect is the Franz-Keldysh effect, seen in direct-gap bulk semiconductor materials, such as GaAs, InP and InGaAs. The electroabsorptive region 920 could be composed of such materials, or other semiconductor direct gap materials well known to those skilled in the art. Another such electroabsorptive effect is the quantum confined Stark effect, seen in quantum well materials, and the electroabsorptive region 920 could be composed of such quantum well materials. Quantum well materials can be made from alternating thin layers of at least two different semiconductor materials, such as GaAs and GaAlAs, or InGaAs and InGaAlAs, or other such materials known to those skilled in the art. Yet another special case of quantum well or multiple thin layered semiconductor electroabsorptive materials are those displaying electroabsorption due to the Wannier-Stark effect, and such materials could also be used to make the electroabsorptive region 920 as is well known to those skilled in the art.

In operation of the saturable absorber 900 of FIG. 9 an input light beam 940, composed most preferably of solitons, is shone on an entrance surface 970 of the saturable absorber 900. In FIG. 9, the light beam is shown impinging on a surface of the p-doped region 910, but the input light beam 940 may be shone on any convenient surface of the saturable absorber 900 that allows the input light beam 940 to reach the electroabsorptive region 920. Initially, some of the input light beam 940 is absorbed by the material of the electroabsorptive region 920. This absorption generates photocarriers in the material of the electroabsorptive region 920. These photocarriers then move under the action of the electric field in the electroabsorptive region 920. The electric field initially present in the electroabsorptive region 920 may be set by a biasing voltage supply 960. The movement of the photocarriers changes the electric field in the electroabsorptive region 920, and this change in electric field changes the absorption of the material constituting the electroabsorptive region 920. Typically (but not necessarily) the movement of the carriers will lead to a reduction of the electric field. In the cases of any of the three electroabsorption mechanisms: the Franz-Keldysh effect, the quantum confined Stark effect or the Wannier-Stark effect, choosing the operating wavelength to be somewhat longer than the spectral position of the zero field band gap of the semiconductor material leads to a reduction of absorption as the electric field is reduced, hence leading to a saturating absorption as desired. This saturating absorption can be observed on a transmitted output beam 950. It is understood that mirrors may also be used with the saturable absorber 900 so that the transmitted output beam 950 may actually emerge from the entrance surface 970 if desired.

A resistor 980 and any capacitance associated with the saturable absorber 900 can control the speed of recovery of the saturable absorber. It is understood that the resistor 980 could be partly or wholly composed of resistance internal to the regions 910 and 930. It is also understood that the device could also operate without any biasing voltage supply 960, with the field in this "self-biased" case being set by the built-in field of the saturable absorber 900.

The physics of the recovery speed of such a device is described in "High-Speed Absorption Recovery in Quantum Well Diodes by Diffusive Electrical Conduction" by G. Livescu, et al., *Applied Physics Letters*, Vol. 54, No. 8, 20 Feb. 1989, pp. 748–750. This article describes how to design the resistivity of the regions 910 and/or 930 to achieve a desired speed of recovery of the absorption in such saturable absorber 900.

The time taken for the absorption to change after the initial absorption of optical energy in the electroabsorptive region 920 depends on the time taken for the photocarriers to transport to the electrodes, and, in the case of quantum well structures, the time taken for the photocarriers to be emitted from the quantum wells. The physics of these processes is well known. At high electrical fields (such as $10^4$ V/cm) in many semiconductor materials, the electron and hole velocities (the electrons and holes being the kinds of photocarriers created in such semiconductors) are typically of the order of $10^7$ cm/s, corresponding to about 10 picoseconds (ps) to move about 1 micron of distance. Such length scales (e.g., 1 micron) and fields (e.g., $10^4$ V/cm–$10^5$ V/cm, corresponding to 1–10 V/micron), are typical in such electroabsorptive saturable absorbers 900, with the electroabsorptive region 920 being typically of a total thickness in the range 0–1 micron to 5 microns (though it is understood that thicknesses outside this range are within the scope of the present invention). The emission time of photocarriers from quantum wells can be adjusted over a broad range by the design of the quantum wells and the choice of operating field. This area has been investigated and discussed in the article "Simultaneous Measurement of Electrons and Hole Sweep-Out from Quantum Wells and Modeling of Photoinduced Field Screening Dynamics" by J. A. Cavaillés, et al., *IEEE Journal of Quantum Electronics*, Vol. 28, No. 10, October 1992, pp. 2486–2497.

It is known, for example, that by using low barriers in quantum wells, the total time for carrier emission and transport through a quantum well region can be of the order of 4 ps, as discussed in the article "Fast Escape of Photocreated Carriers Out of Shallow Quantum Wells" by J. Feldman, et al., *Applied Physics Letters*, Vol. 59, No. 1, 1 July 1991, pp. 66–68. Hence, it is possible to make the change in absorption due to field-screening electroabsorption occur much faster than the 50 ps time scale typical of pulse lengths in soliton transmission systems, while controlling the recovery time of the change of absorption to be of the order of 50 ps through the choice of the resistor 980. These properties are desirable for the use of a saturable absorber in reducing noise in a soliton transmission system.

Figure 10:
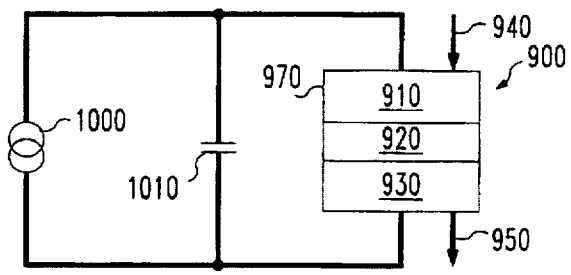
FIG. 10 illustrates a schematic diagram of yet a further alternative embodiment of the apparatus of FIG. 3 employing a current source and using the electroabsorptive effect to increase absorption.

One particularly advantageous way of using the concept of a field-screening electroabsorptive saturable absorber is shown in FIG. 10. In this case, a current source 1000 is used. As those of ordinary skill in the art understand, a current source is an electrical supply that delivers substantially the same current over a usable range of output voltages. The combination of the current source 1000 and a capacitance 1010 ensures that the average current passing through the modulator under the desired operating conditions is the desired value $I_s$, while still allowing transient currents, associated with the rapid recovery of the electrical voltage over the saturable absorber 900 as the absorption recovers, to flow as required. In this case the capacitor serves as an AC low impedance to pass the transient currents without substantially affecting the average DC current $I_s$. It is understood that, in practice, the capacitance 1010 may be capacitance that is intrinsic to the physical structure used to make the saturable absorber 900, or may be stray capacitance associated with wiring, or may be capacitance intrinsic to the actual structure used to make the current source 1000.

It is well known, and described in the article "The Quantum Well Self-Electrooptic Effect Device: Optoelectronic Bistability and Oscillation, and Self-Linearized Modulation" by D. A. B. Miller, et al., *IEEE Journal of Quantum Electronics*, Vol. QE-21, No. 9, September 1985, pp. 1462–1476, that driving an electroabsorption-modulating diode (the saturable absorber 900) with a current source in a region where absorption increases with increasing reverse bias can lead to a useful operating mode referred to as "self-linearized modulation." In this mode, over some useful range of absorption and voltage, the voltage over the diode automatically adjusts so that the photocurrent generated by the diode is (on average at least) equal to the average drive current $I_s$. Since it is typically the case in many such diode structures that one electron of photocurrent is generated for each photon absorbed in the electroabsorptive region 920, the number of photons absorbed per second on the average (and hence the average absorbed power) is controlled by the current source. An important point about this automatic control is that the same average power is absorbed independent of the precise wavelength of the light, and independent of device operating temperature, at least over usable operating ranges of wavelengths and temperatures. Hence, in operation of the saturable absorber 900, the average fractional absorption of the saturable absorber can be automatically set, independent of the precise wavelength of the light or the precise operating temperature. Hence the need for precise temperature stabilization and any need to have different devices of different device control parameters for operation at different wavelengths is avoided.

Although the present invention has been described in detail, those skilled in the art should understand that they can make various changes, substitutions and alterations herein without departing from the spirit and scope of the invention in its broadest form.

What is claimed is:

1. For use in a soliton optical pulse transmission system, an apparatus for increasing a signal-to-noise ratio of said system, comprising:

a first optical component for receiving a soliton and an accompanying background noise from said system and increasing a power density of said soliton and said accompanying background noise by spatially concentrating said soliton and said accompanying background noise;

a saturable absorber, having a predetermined recombination rate, for receiving and absorbing a portion of said soliton and said accompanying background noise, said predetermined recombination rate causing said saturable absorber to absorb a lesser portion of said soliton than of said accompanying background noise, said component having spatially concentrated said soliton and said accompanying background noise to increase a sensitivity of said saturable absorber, said apparatus thereby increasing said signal-to-noise ratio of said system; and a second optical component for receiving and spatially restoring a remaining portion of said soliton and said accompanying background noise, said second optical component returning said spatially-restored soliton and said accompanying background noise to said system.

2. The apparatus as recited in claim 1 wherein said first and second optical components are refractive elements composed of a material having an index of refraction higher than that of a core of an optical fiber of said system.

3. The apparatus as recited in claim 1 wherein said saturable absorber is composed of a material selected from the group consisting of:

gallium arsenide (GaAs), indium gallium arsenide (InGaAs), gallium aluminum arsenide (GaAlAs), indium gallium aluminum arsenide (InGaAlAs), and indium phosphide (InP).

4. The apparatus as recited in claim 1 wherein said system is a wavelength division multiplexing (WDM) system capable of carrying a plurality of channels, said apparatus further comprising a WDM filter for separating said plurality of channels into separate optical paths, each of said separate optical paths having one of said apparatus for increasing said signal-to-noise ratio associated therewith, said WDM filter recombining said plurality of separate optical paths.

5. The apparatus as recited in claim 1 further comprising conductive layers disposed about said saturable absorber for generating an electric field proximate said saturable absorber, said electric field stimulating an electroabsorptive effect in said saturable absorber to increase said absorbing of said portion of said spatially-concentrated soliton and accompanying background noise.

6. For use in a soliton optical pulse transmission system, a method of increasing a signal-to-noise ratio of said system, comprising the steps of:

receiving a soliton and an accompanying background noise from said system;

increasing a power density of said soliton and said accompanying background noise by spatially concentrating said soliton and said accompanying background noise;

absorbing a lesser portion of said soliton than of said accompanying background noise with a saturable absorber having a predetermined recombination rate, said soliton and said accompanying background noise spatially concentrated to increase a sensitivity of said saturable absorber; spatially restoring said soliton and said accompanying background noise; and returning said soliton and said accompanying background noise to said system, said signal-to-noise ratio of said system thereby increased.

7. The method as recited in claim 6 further comprising the steps of disposing first and second generally hemispherical optical components on opposite sides of said saturable absorber.

8. The method as recited in claim 6 wherein said step of absorbing comprises the step of transmitting said soliton and said accompanying background noise through a saturable absorber composed of a material selected from the group consisting of:

gallium arsenide (GaAs), indium gallium arsenide (InGaAs), gallium aluminum arsenide (GaAlAs), indium gallium aluminum arsenide (InGaAlAs), and indium phosphide (InP).

9. The method as recited in claim 6 wherein said system is a wavelength division multiplexing (WDM) system capable of carrying a plurality of channels, said method further comprising the steps of:

separating said plurality of channels into separate optical paths, each of said separate optical paths having one of said apparatus for increasing said signal-to-noise ratio associated therewith; and recombining said plurality of separate optical paths prior to said step of returning.

10. The method as recited in claim 6 further comprising the step of generating an electric field proximate said saturable absorber, said electric field stimulating an electroabsorptive effect in said saturable absorber to increase said absorbing of said portion of said spatially-concentrated soliton and accompanying background noise.

11. A wavelength division multiplexing (WDM) soliton optical pulse transmission system, comprising:

an optical transmitter having a drive circuit and a light source for converting an input electronic signal into solitons;

an optical fiber having a cladding surrounding a core and capable of transmitting at least two separate channels of solitons of different wavelength, cross-coupling between said at least two channels generating an accompanying background noise;

a first optical component for increasing a power density of said solitons and said accompanying background noise by spatially concentrating said soliton and said accompanying background noise;

a saturable absorber, having a predetermined recombination rate, for receiving and absorbing a portion of said solitons and said accompanying background noise, said predetermined recombination rate causing said saturable absorber to absorb a lesser portion of said solitons than of said accompanying background noise, said component having spatially concentrated said solitons and said accompanying background noise to increase a sensitivity of said saturable absorber, said solitons and said accompanying background noise returned to said optical fiber via a second optical component, a signal-to-noise ratio of said system thereby increased; and an optical receiver, having a photodetector and a signal conditioner, for transforming said solitons and said accompanying background noise into an output electrical signal.

12. The apparatus as recited in claim 11 wherein said first and second optical components are refractive elements composed of a material having an index of refraction higher than that of a core of an optical fiber of said system, said first and second optical components and said saturable absorber disposed within a silicon substrate associated with said system.

13. The system as recited in claim 11 wherein said saturable absorber is composed of a material selected from the group consisting of:

gallium arsenide (GaAs), indium gallium arsenide (InGaAs), gallium aluminum arsenide (GaAlAs), indium gallium aluminum arsenide (InGaAlAs), and indium phosphide (InP).

14. The system as recited in claim 11 further comprising a WDM filter for separating said plurality of channels into separate optical paths, each of said separate optical paths having a saturable absorber associated therewith, said WDM filter recombining said plurality of separate optical paths before returning said spatially-restored solitons and said accompanying background noise to said optical fiber.

15. The system as recited in claim 11 further comprising conductive layers disposed about said saturable absorber for generating an electric field proximate said saturable absorber, said electric field stimulating an electroabsorptive effect in said saturable absorber to increase said absorbing of said portion of said spatially-concentrated solitons and accompanying background noise.

* * * * *